US007962530B1

(12) United States Patent
Kolta

(10) Patent No.: US 7,962,530 B1
(45) Date of Patent: Jun. 14, 2011

(54) METHOD FOR LOCATING INFORMATION IN A MUSICAL DATABASE USING A FRAGMENT OF A MELODY

(76) Inventor: Michael Joseph Kolta, Latham, NY (US)

( * ) Notice: Subject to any disclaimer, the term of this patent is extended or adjusted under 35 U.S.C. 154(b) by 487 days.

(21) Appl. No.: 12/150,093

(22) Filed: Apr. 24, 2008

Related U.S. Application Data

(60) Provisional application No. 60/914,586, filed on Apr. 27, 2007.

(51) Int. Cl.
*G06F 17/30* (2006.01)
(52) U.S. Cl. ......... 707/805; 707/756; 717/106; 717/140
(58) Field of Classification Search .................. 707/804, 707/999.107, 802, 805, 756; 717/106, 140
See application file for complete search history.

(56) References Cited

U.S. PATENT DOCUMENTS

| | | | | |
|---|---|---|---|---|
| 6,124,543 | A * | 9/2000 | Aoki ............................... | 84/609 |
| 7,016,841 | B2 * | 3/2006 | Kenmochi et al. ............ | 704/258 |
| 7,439,441 | B2 * | 10/2008 | Jarrett et al. .................... | 84/603 |
| 7,756,847 | B2 * | 7/2010 | Pauws et al. ................... | 707/705 |
| 2007/0162497 | A1 * | 7/2007 | Pauws ........................ | 707/104.1 |

OTHER PUBLICATIONS

Ramgopal Mettu. ECE697S: Topics in Computational Biology, Lecture 3: Sequence Alignment Methods. Feb 2, 2008 http://www.ecs.uamass.edu/~mettu/ece697s/lectures/alignment.ppt.
T.F. Smith et al. Identification of Common Molecular Subsequences. Journal of Molecular Biology. Academic PRess Inc. (London) Ltd. 147:195-197.
Syncplayer—An Advanced System for Multimodal Access. University of Bonn , Computer Science, Dept. III—Multimedia Signal Processing Group Prof. Dr. Michael Clause http://www-mmdb.iai.uni-bonn.de/projects/syncplayer/.
SyncPlayer Homepage. University of Bonn , Computer Science, Dept. III—Multimedia Signal Processing Group Prof. Dr. Michael Clause http://audentify.iai.uni-bonn.de/synchome/ and http://audentify.iai.uni-bonn.de/synchome/index.php?pid=03.
Parsons, Denys. "The Directory of Tunes and Musical Themes". Spencer Brown & Co.: Cambridge, England, Jan. 1975.
Petrov, Peter Angelov. Smith-Waterman Algorithm Implmented. Nov. 2007. http://www.geocities.com/sedefcho/www/algorithms/smith_waterman.html.
William P. Birmingham et al. (2001). Musart: Music Retrieval Via Aural Queries. In: Proceedings of 2nd Annual International Symposium on Music Information Retrieval 2001 (pp. 73-81): Oct. 15-17, 2001, Bloomington, Indiana (USA). http://ismir2001.ismir.net/pdf/birmingham.pdf.

(Continued)

*Primary Examiner* — Cheryl Lewis
(74) *Attorney, Agent, or Firm* — Maxine Barasch & Associates, PLLC

(57) ABSTRACT

A system and method for retrieving musical information from a database based on a melody fragment. The system may be used by a person without formal musical training to retrieve musical data (e.g., the name of a song, bibliographic information about a song, or the song itself) from a database by providing the melody or fragment of the melody of the desired music to a computer interface. The melody may be provided by singing, humming, whistling, or playing a musical instrument, for example, a keyboard. The inputted melodic information is encoded using relative changes in pitch and rhythm throughout the melody. The encoded information is then compared using a matching algorithm to similarly encoded melodic information representative of many musical pieces (e.g., songs). Results may also be sorted using a weighted algorithm.

22 Claims, 4 Drawing Sheets

OTHER PUBLICATIONS

Suyoto, Iman S. H. et al. (2005). Simple Efficient N-Gram Indexing for Effective Melody Retrieval. In: Proceedings of the Music Information Retrieval, Maarten Grachten et al. (2004). Melodic Similarity, Looking for a Good Abstraction Level. In: Proceedings of 5th International Gillet, Olivier et al. "Drum Loops Retrieval From Spoken Queries." Journal of Intelligent Information Systems 24(2): 159-177, 2005.

Chen, James C. C. et al (1998). Query by Rhythm: An Approach for Song Retrieval in Music Databases. In: Proceedings of Eighth International Workshop on Research Issues in Data Engineering, (pp. 139-146).

Adams, Norman H. et al (2004). Time Series Alignment for Music Information Retrieval. In: Proceedings of 5th International Conference on Music Information Retrieval: Oct. 10-15, 2004, Barcelona (Spain). http://ismir2004.ismir.net/proceedings/p056-page-303-paper144.pdf.

Downie, J. Stephen et al, (2004). The International Music Information Retrieval Systems Evaluation Laboratory: Governance, Access and Security. In: Proceedings of 5th International Conference on Music Information Retrieval: Oct. 10-15, 2004, Barcelona (Spain). http://ismir2004.ismir.net/proceedings/p002-page-9-paper220.pdf.

Pauws, Steffen (2002). CubyHum: A Fully Operational Query by Humming System. In: Proceedings of the 3rd International Conference on Music Information Retrieval (pp. 187-196): Oct. 13-17, 2002, Paris (France) http://ismir2002.ismir.net/proceedings/02-FP06-2.pdf#search=%22%22melody%20encoding%22%22.

Jia-Lien, HSU, et al. (2002). The Effectiveness Study of Various Music Information Retrieval Approaches. In: Proceedings of the Eleventh International Conference on Information and Knowledge Management, Session: Music information retrieval (pp. 422-429): Nov. 4-9, 2002, SAIC Headquarters, McLean, VA (USA). http://portal.acm.org/citation.cfm?id=584862&dl.

Fuschi, David et al (2003). "MusicNetwork Scenarius." Version 3.6, Jun. 27, 2003. In: Second MusicNetwork Open Workshop: University of Leeds, Leeds, UK, Sep. 17-18, 2003. ttp://www.interactivemusicnetwork.org/events/Second_OpenWorkshop_2003/13.doc.

Allamanche, Eric (2001). Content-based Identification of Audio Material Using MPEG-7 Low Level Description. In: Proceedings of 2nd Annual International Symposium on Music Information Retrieval 2001 (pp. 197-204): Oct.15-17, 2001, Bloomington, Indiana (USA). http://ismir2001.ismir.net/pdf/allamanche.pdf.

Bello, Juan Pablo, et al (2000). Techniques for Automatic Music Transcription. In: Proceedings of International Symposium on Music Information Retrieval: Oct. 23-25, 2000, Plymouth, Massachusetts (USA). http://ismir2000.ismir.net/papers/bello_paper.pdf.

Stuart Bray et al (2005). Distributed Audio Feature Extraction for Music. In: Proceedings of 6th International Conference on Music Information Retrieval (pp. 434-437): Sep. 11-15, 2005, London (UK). http://ismir2005.ismir.net/proceedings/2125.pdf.

Rainer Typke et al (2005). A Survey of Music Information Retrieval Systems. In: Proceedings of 6th International Conference on Music Information Retrieval (pp. 153-160): Sep. 11-15, 2005, London (UK). http://ismir2005.ismir.net/proceedings/1020.pdf.

Seungmin Rho et al. FMF: Query Adaptive Melody Retrieval System. The Journal of Systems and Software. vol. 79 (2006) pp. 43-56. Dec. 24, 2004.

Dan Berger. A Music Data Mining and Retrieval Primer. May 27, 2003. www.cs.ucr.edu/~dberger/Documents/miningmusic.pdf.

The Foafing Music (Music Technology Group). http://foafing-the-music.iua.upf.edu/index.html.

MIR Systems On-Line. http://mirsystems.info.

Musicsurfer (Music Technology Group). http://musicsurfer.iua.upf.edu.

Musipedia. The Parsons Code for Melodic Contours. http://www.musipedia.org/pcnop.0.html.

Shyamala Doraisamy et al (2001). An Approach Towards A Polyphonic Music Retrieval System. In: Proceedings of 2nd Annual International Symposium on Music Information Retrieval (pp. 187-193): Oct. 15-17, 2001, Bloomington, Indiana (USA). http//www.ismir.net/proceedings/index.php?table_name=papers& function=search& where_clause=%60papers%60.%60Year%60+%3D+%272001%27&page=0&order=Authors&order_type=ASC.

John Duchi et al (2005). Query by Humming: Finding Songs in a Polyphonic Database. www.stanford.edu/~jduchi/projects/qbh.pdf.

Jeremy Pickens (2004). Harmonic Modeling for Polyphonic Music Retrieval. Dissertation submitted to University of Massachusetts Amherst. citeseer.ist.psu.edu/pickens04harmonic.html.

Donald Byrd et al (2002). The History of Ismir—A Short Happy Tale. D-Lib Magazine, vol. 8, No. 11 ISSN: 1082-9873. http://www.ismir.net/texts/Byrd02.html.

T. De Mulder et al (2004). Recent Improvements of an Auditory Model Based Front-End for the Transcription of Vocal Queries citeseer.ist.psu.edu/pickens04harmonic.html.

David Bainbridge et al (2003). How People Describe Their Music Information Needs: A Grounded Theory Analysis of Music Queries. In: Fourth International Conference on Music Information Retrieval: Oct. 26-30, 2003, Baltimore, Maryland (USA). http://ismir2003.ismir.net/papers/Bainbridge.pdf.

Shyamala Doraisamy et al. Emphasizing the Need for TREC-like Collaboration Towards MIR Evaluation www.doc.ic.ac.uk/~srueger/www-pub/sigir03-music.pdf and http://citeseerx.ist.psu.edu/viewdoc/summary;sessionid=0AC6A314FCCF5789AA5C7C4D5F81DD9F?doi=10.1.1.65.766.

Francois Pachet et al. Popular Music Access: The Sony Music Browser. Journal of the Ammerican Society for Information Science and Technology. 55(12), 1037-1044, Wiley, 2004. http://wwvv.csl.sony.fr/publications/item/?reference=pachet%3A02a.

Pandora. Pandora Media, Inc. www.Pandora.com.

C-Brahms Retrieval Engine for Melody Searching. http://www.cs.helsinki.fi/group/cbrahms/demoengine/.

Tanzen*. http://www.ee.iitb.ac.in/uma/~daplab/index.htm. Included for completeness—Site says "Access forbidden" Applicant cannot access site and does not have a copy.

Sloud. www.Sloud.com. Included for completeness—site says "Access forbidden" Applicant cannot access site and doesn't have copy.

Meldex. http://www.nzdl.org/fast-cgi-bin/music/musiclibrary.

PlaySOM. Vienna University of Technology Institute of Software Technology and Interactive Systems Information & Software Engineering Group. http://www.ifs.tuwien.ac.at/mir/playsom.html.

The SOM-enhanced JukeBox (SOMeJB) Music Digital Library Project. Department of Software Technology and Interactive Systems, Vienna University of Technology. http://www.ifs.tuwien.ac.at/~andi/somejb/.

Themefinder. Center for Computer Assisted Research in the Humanities at Stanford University. http://themefinder.org.

Richard Lewis Kline, PhD. Algorithms for Error-Tolerant Information Retrieval From Music Databases Using Vocal Input. Rensselaer Polytechnic Institute: Rensselaer, NY (2002).

Ricardo Baeza-Yates et al. Modern Information Retrieval. Addison Wesley: New York, NY, 1999.

Pevzner, Pavel and Jones, Neil. An Introduction to Bioinformatics Algorithms_. Massachusetts: MIT Press, 2004.

* cited by examiner

Figure 1
Figure 2
| P CODE  | D | R | U | D | R | U | D | R | U |
|---------|---|---|---|---|---|---|---|---|---|
| K CODE  | S | S | S | R | R | R | L | L | L |
| KP CODE | A | B | C | D | E | F | G | H | I |
Figure 3

DNA 1:  AAGGCGA
DNA 2:  AAAGAGCCGAG

With a provided SM:

|   | A  | G  | C  | T  |
|---|----|----|----|----|
| A | 10 | -1 | -3 | -4 |
| G | -1 | 7  | -5 | -3 |
| C | -3 | -5 | 9  | 0  |
| T | -4 | -3 | 0  | 8  |

GAP PENALTY: -5

Figure 4

AAG-GC-GA  AAGAGCCGA score: 50

Figure 5

|   | A | B | C | D | E | F | G | H | I |
|---|---|---|---|---|---|---|---|---|---|
| A | 10 | 5 | 0 | 5 | -5 | -5 | 0 | -15 | -20 |
| B | 5 | 15 | 5 | 0 | 0 | 0 | -5 | -10 | -15 |
| C | 0 | 5 | 10 | -5 | -5 | 5 | -10 | -15 | -10 |
| D | -5 | -10 | -15 | 10 | 5 | 0 | -5 | -10 | -15 |
| E | -10 | -5 | -10 | 5 | 15 | 5 | -10 | -5 | -10 |
| F | -15 | -10 | -5 | 0 | 5 | 10 | -15 | -10 | -5 |
| G | -10 | -15 | -10 | 5 | -5 | -5 | 10 | 5 | 0 |
| H | -15 | -10 | -5 | 0 | 0 | 0 | 5 | 15 | 5 |
| I | -20 | -15 | 0 | -5 | -5 | 5 | 0 | 5 | 10 |

Gap Penalty: -5

Figure 6a

|   | A | B | C | D | E | F | G | H | I |
|---|---|---|---|---|---|---|---|---|---|
|   | -18 | 40 | -22 | -31 | -33 | 7 | -22 | -32 |
| B | 49 | 12 | -10 | 21 | 26 | -30 | -31 | -34 | -35 |
| C | 16 | -21 | -10 | 16 | 16 | 10 | -37 | -28 | -32 |
| A | 48 | -24 | -12 | 20 | 8 | 10 | 8 | -19 | 8 |
| E | -14 | 8 | -26 | 16 | 22 | -29 | -24 | 5 | 13 |
| F | -32 | 2 | -6 | -41 | 8 | 10 | -9 | 0 | -14 |
| G | -21 | -14 | 13 | 6 | -25 | -34 | 20 | -14 | 8 |
| H | -12 | -18 | -2 | 12 | 16 | -4 | -24 | 20 | -24 |
| I | 8 | -24 | 0 | 8 | 3 | -10 | -24 | -25 | 10 |

Gap Penalty: -58

Figure 6b

|   | A   | B   | C   | D   | E   | F   | G   | H   | I   |
|---|-----|-----|-----|-----|-----|-----|-----|-----|-----|
| A | 32  | -8  | -3  | -16 | -9  | -16 | 31  | -8  | 15  |
| B | 20  | 13  | -21 | 16  | -16 | -9  | 7   | -8  | -32 |
| C | 18  | -16 | -24 | 16  | 0   | -24 | -1  | 8   | -32 |
| D | 18  | -2  | -4  | 18  | -7  | -14 | 9   | 16  | -10 |
| E | 10  | 8   | -21 | 2   | -20 | -1  | 0   | 2   | 1   |
| F | -14 | -14 | -6  | 8   | 5   | -26 | 8   | -16 | -2  |
| G | 10  | -16 | -16 | -16 | 24  | 8   | 13  | 2   | 0   |
| H | 10  | -16 | 0   | -16 | -19 | -12 | -17 | 1   | -8  |
| I | 10  | -2  | -5  | -8  | -6  | -5  | 2   | 0   | 0   |

Gap Penalty: -34

Figure 6c

METHOD FOR LOCATING INFORMATION IN A MUSICAL DATABASE USING A FRAGMENT OF A MELODY

RELATED APPLICATIONS

This application is based in part on U.S. Provisional Patent Application Ser. No. 60/914,586, titled METHOD FOR RETRIEVAL OF MUSIC FROM A DATABASE, filed Apr. 27, 2007, and claims priority thereto in accordance with 37 C.F.R. §1.78a(4). U.S. Provisional Patent Application Ser. No. 60/914,586 is also included herein, in its entirety, by reference.

FIELD OF THE INVENTION

The invention pertains to musical information retrieval and, more particularly, to a method for locating information in a musical database using a fragment of a melody.

BACKGROUND OF THE INVENTION

Music Information Retrieval (MIR) is the term applied to the interdisciplinary science of retrieving information from music. MIR is, in fact, a subset of the broader process of Information Retrieval (IR), and is a relatively new but quickly growing field. MIR typically focuses on using the content of the music to locate bibliographic information about the music.

The rapid growth of MIR is believed to be a direct result of people currently having access to massive amounts of music, typically digital music, as compared to people in earlier time periods. This increase in music availability has several contributing factors, possibly the most significant being almost universal access to the Internet, where virtually an unlimited amount of digital music is available for listening and/or downloading. Advances in electronic hardware (e.g., computer, MP3 player, cellular telephone, etc.) technology have also contributed to the increase in demand for MIR systems.

It is becoming somewhat commonplace for individuals to have hundreds, if not thousands, of digital songs on their home computers or portable audio players. MIR offers new ways to search such massive amounts of music (i.e., music databases) and to locate and/or retrieve music therefrom.

Currently available query methods for finding music (e.g., query by genre, year, artist, album title, song title, or lyrics) work for many situations. These types of bibliographic queries for music are estimated to account for over 80% of people's music query needs. However, MIR offers additional query possibilities for situations such as when a user can only remember excerpts of musical content (e.g., a melody) and does not know the lyrics or any other textual (i.e., bibliographic) information about the piece for which he/she is searching.

While MIR methods exist for retrieving musical information from a database using musical content, such methods often require extensive musical training for a user and/or yield inconsistent and generally poor results. Thus, there exists a need for systems and methods of retrieving musical information from a database using musical content which do not require extensive musical training, yield better results, and are user-friendly.

SUMMARY OF THE INVENTION

In accordance with the present invention, there is provided a system and method for retrieving musical information from a database based on a melody fragment. The novel system and method may be used by a person without formal musical training to retrieve musical data (e.g., the name of a song, bibliographic information about a song, or the song itself) from a database by providing the melody or fragment of the melody of the desired music to a computer interface. The melody may be provided by singing, humming, whistling, or playing a musical instrument, for example, a keyboard.

The inputted melodic information is encoded using relative changes in the pitch and rhythm throughout the melody. The encoded information is then compared, generally using a matching algorithm, to similarly encoded melodic information representative of many musical pieces (e.g., songs). Results may also be sorted using a weighted algorithm.

It is, therefore, an object of the invention to provide a method and system for retrieving information about a song from a database by providing only a fragment of the melody of the song.

It is another object of the invention to provide a method and system for retrieving information about a song from a database wherein a fragment of a melody is presented to a user interface.

It is an additional object of the invention to provide a method and system for retrieving information about a song from a database wherein the fragment of a melody is analyzed, and the relative pitch of successive notes of the melodic fragment are encoded.

It is a further object of the invention to provide a method and system for retrieving information about a song (i.e., song) from a database wherein the fragment of a melody is analyzed and the relative duration of successive notes of the melodic fragment are encoded.

It is a still further object of the invention to provide a method and system for retrieving information about a song from a database wherein the fragment of a melody is analyzed and both the relative pitch and relative duration of successive notes of the melodic fragment are encoded.

It is another object of the invention to provide a method and system for retrieving information about a song from a database wherein the fragment of a melody is provided to a user interface auditorily by singing, humming, playing a musical instrument, or by any other means for producing an audible rendering of the melodic fragment.

It is yet another object of the invention to provide a method and system for retrieving information about a song from a database wherein a comparison algorithm is used to match an encoded representation of a melodic fragment to similarly encoded melodic information in a database.

It is an additional object of the invention to provide a method and system for retrieving information about a song from a database wherein a Smith-Waterman comparison algorithm is used to match an encoded representation of a melodic fragment to similarly encoded melodic information in a database.

It is a further object of the invention to provide a method and system for retrieving information about a song from a database wherein a melodic fragment is encoded using a Parsons code and a Kolta code.

BRIEF DESCRIPTION OF THE DRAWINGS

Various objects, features, and attendant advantages of the present invention will become more fully appreciated as the same becomes better understood when considered in conjunction with the accompanying drawings and wherein:

FIG. 1 is a musical notation of a melodic fragment and of a Parsons code representation of successive notes of the melodic fragment;

FIG. 2 is a musical notation of a melodic fragment and a Kolta code representation of successive notes thereof in accordance with the present invention;

FIG. 3 is a chart showing nine possible unique combinations of Parsons and Kolta codes;

FIG. 4 is a sample scoring matrix for use with the Smith-Waterman algorithm as applied to DNA analysis;

FIG. 5 is a chart showing a result using the scoring matrix of FIG. 4;

FIG. 6a is an initial scoring matrix in accordance with the present invention;

FIG. 6b is a modified scoring matrix based upon experimental data obtained from subjects evaluating the inventive system; and FIG. 6c is another modified scoring matrix based upon experimental data obtained from subjects evaluating the inventive system.

DETAILED DESCRIPTION OF THE PREFERRED EMBODIMENT

The present invention provides a system and method for locating information about a piece of music based upon the matching of a fragment of musical content (e.g., melody, rhythm, etc.) against a database of music.

Much research has been done in the field of Music Information Retrieval (MIR) in the past several years. In fact, there are Web sites and services currently available that claim to have the ability to find a song based on musical input, such as whistling, MIDI input via an instrument of some kind, or by inputting a short excerpt from an actual recording. The goal of an MIR system is to allow a user the ability to query a database of musical information by singing or humming the melody, and then match his/her input against a database of audio files to find the song. The effectiveness of known prior art systems is considered to be low. In addition, such systems are typically difficult to use and/or may require extensive musical training to operate.

The system of the present invention overcomes the limitations of such prior art systems and provides high effectiveness in locating information about a song based upon a melodic and rhythmic input by a user. In addition, the inventive system is readily usable by persons having little or no formal musical training.

As used herein, the term, "song" or "tune," is used to describe inclusively any type of musical selection having a distinct melody.

The tonal query aspect of the system of the present invention is based in part on Parsons Code for Melodic Contour (PCMC) introduced by Denys Parsons in his book titled "The Directory of Tunes and Musical Themes"[1] published in 1975. PCMC is a system for finding melodies and identifying the "tunes" from which they originate based on pitch. The PCMC is a simplified system for representing a melody. Each melody may be described as a string using combinations of only three letters: "U," "D," and "R." "U" signifies that a note is "Up" or higher as compared to the preceding note. Likewise, "D" signifies that a note is "Down" or lower as compared to the preceding note. "R" signifies that a note is a "Repeat" of, or the same pitch as, the preceding note.

Parsons, in his book, listed the first 15 such letters of over 10,000 songs (documents), and astonishingly, the resulting strings were all unique. His book is affectionately known as the "Up-Down" book, and it is still used today by music teachers and other music professionals.

It is believed that the PCMC is well-known to persons of skill in the art and is not described in further detail herein.

Referring first to FIG. 1, there is shown an example of a simple melody (the first theme from Beethoven's 8$^{th}$ Symphony) with the PCMC code (or "Parsons Code") associated with each respective note shown therebelow. Each pair of consecutive notes is coded as "U" ("up") if the second note is higher than the first note, "R" ("repeat") if the pitches are equal, and "D" ("down") otherwise. In the example of FIG. 1, rhythm is completely ignored. Thus, the first theme from Beethoven's 8th symphony that is shown above would be coded DUUDDDURDRUUUU. Note that the first note of any tune is used only as a reference point and does not show up explicitly in the Parsons code. Typically, an asterisk (*) is entered in the Parsons code field for the first note.

Parsons thereby showed that this simple encoding of tunes, which ignores most of the information in the musical signal, can still provide enough information for distinguishing among a large number of tunes.

Expanding on the Parsons concept of melodic (i.e., pitch) contours, rhythmic information in a melody may likewise be encoded. A Kolta code, named for the inventor of the present novel MIR system, may be formed using a code wherein "L" represents that a note is longer in duration than a preceding note; "S" represents that a note is shorter in duration than a preceding note; "R" represents that a note has a length identical in duration to a preceding note; and "P" represents a pause or rest. The example of FIG. 2 shows the melodic line of FIG. 1 with a corresponding Kolta code value beneath each respective note.

When a letter of the alphabet is arbitrarily assigned to each possible combination of a letter from the Parsons code and a letter from the Kolta code, nine unique combinations of Parsons and Kolta codes may be assigned. These unique alphabet letters are referred to herein as the "KP code." For example, if for a pair of consecutive notes, the second note is down as compared to the first, and the second note is shorter as compared to the first, this would be assigned a "D" and an "S" in the Parsons and Kolta codes, respectively. This combination is represented in the KP code as an "A." If the second note was a repeat in pitch and longer in duration as compared to the first note, this combination is assigned an "H." A chart showing the nine unique KP code combinations is shown in FIG. 3.

As may readily be determined, the Kolta code for rhythmic pattern of the melodic line of FIGS. 1 and 2 is SRRRLSR-RRRRRRL (FIG. 2). The Kolta code information in conjunction with the Parsons code information, can be used to uniquely identify a melody from fewer notes (i.e., a shorter melodic portion) than with the Parsons code alone. It is commonly believed that approximately 16 data points (i.e., 16 pitch intervals) are required when using only the Parsons code to uniquely identify a melody. It is believed that the addition of a corresponding Kolta code in conjunction with the Parsons code may uniquely identify a melody with many fewer data points. It has been found that as few as eight relative pitch intervals (Parsons code) and eight corresponding relative note lengths (Kolta code) corresponding to the same notes is sufficient to uniquely identify a melody. The mathematical evaluation presented hereinbelow supports this conclusion.

Of course, the encoded information (i.e., the "KP code") must be compared to suitable information in a database. The comparison is performed using the Smith-Waterman Algorithm ("SWA"), which was developed for DNA-matching in the field of bioinformatics[2]. While the Smith-Waterman Algorithm is used for purposes of disclosure, it will be recognized that other suitable matching algorithms exist that may be substituted therefor. Consequently, the invention includes the use of any suitable matching algorithms.

SWA provides a solution to the local sequence alignment problem encountered in the field of bioinformatics. The purpose of the SWA is to determine how similar, and thus, how closely "related," two different sequences of DNA or proteins are. For the sake of simplicity, only DNA sequences are further discussed herein. The SWA requires inputs consisting of the two sequences of DNA samples, a Scoring Matrix ("SM"), and a Gap Penalty (GP). Referring now to FIG. 4, there is shown two exemplary DNA strings, a related SM, and a Gap Penalty forming typical inputs to the SWA.

The SM represents the score assigned for matching certain letters together from the two samples of DNA (DNA1, DNA2). The SM illustrated in FIG. 4 happens to be symmetric, as is typically the case in bioinformatics. So if there is an "A" from one sample matched up with an "A" from a second sample, a value of 10 is 'read' from the SM. Consequently, 10 is added to the overall score. If a "T" from one sample is matched with an "A" from another sample, 4 is deducted from the overall score. The SWA finds the maximum score possible for aligning the two strands of DNA through the use of recursion.

FIG. 5 displays the results of analysis of the exemplary DNA samples of FIG. 4. The dashes represent gaps. In this example, the first "A" and the last "G" from the second sample were not considered a part of the match and also were not assigned a GP. The resulting SWA illustrates the best way to match the two samples, including the two gaps, with a score of 50.

The system of the invention applies the SWA to the KP codes (FIG. 3) to compare an inputted, encoded melodic fragment to a database of similarly encoded melodies. Consequently, a larger SM is required, in point of fact, one 9×9 matrix to accommodate the nine unique combinations of the KP code. However, while it is well known that the SM values, which have been derived from known biological facts about DNA or protein, are standard numbers for bioinformatics problems, the SM has never before been applied to an MIR problem. Consequently, no such standardized SM values exist for an SM applied to melody matching, so initial SM values based upon educated guesses were assumed.

FIG. 6a shows a 9×9 SM containing the aforementioned assumed initial values. The underlying philosophy in assigning values to the SM of FIG. 6a is that an exact match should get the highest score, and the most opposite mismatch should get the worst penalty. For example, a "B" matched with a "B" (where "B" represents Repeat Short) gets a high score of 15. An "I" matched with a "B" (where "I" represents Up Long, which is quite different than Repeat Short) is assigned a penalty of 15. The chosen initial values in the SM of FIG. 6a attempt to achieve the goal that the more similar two melodies are musically, the higher the score will be when aligning them using the SWA and the KP codes.

The SM of FIG. 6a provided reasonable results with a Query Effectiveness (QE) of 563.04. QE is discussed in detail hereinbelow. The question is whether the assumed values of the SM of FIG. 6a determine values for an optimum SM. A survey (Appendix I) was administered to 131 volunteers of varying musical backgrounds. None of the subjects were professional musicians or music majors in college. After a few "warm-up" questions, the survey required each of the subjects to use KP code to enter information into a user interface about the melody of a song that he/she was already familiar with and could encode without listening to beforehand. The subjects were presented with 67 possible songs (i.e., documents) that were encoded and provided in a test database. Subjects were required to use a melody (i.e., song) selected from a list of the aforementioned 67 songs.

As an example, one participant chose to encode the song "Fur Elise" by Beethoven.

The following represent the respective Parsons and Kolta codes entered:

P code: D,U,D,U,D,U,D,D
K code: R,R,R,R,R,R,R,L.

The entered KP code is exactly correct, and thus, the desired document was retrieved as an exact match. It is reassuring that this is the highest scoring alignment out of any document in the database for this query, using the SWA with the entered KP code and SM of FIG. 6a.

Similar data was collected for all 131 participants, with each participant selecting the song of his/her choice from the provided list of 67 documents.

It was necessary to create a tool to measure the effectiveness of the method of the invention. A metric called Query Effectiveness (QE) was defined as the total number of documents in the database divided by the number of documents that returned a score (i.e., a matching result value) greater than or equal to the score of the correct document (i.e., the document the user was intending to locate). Note that QE is the number of documents in the database. The goal of the experiment was to determine the maximum QE, that is, QE_MAX.

An algorithm was constructed and encoded as shown below. The goal is to find the maximum QE, QE_MAX. The machine learning procedure requires the following variables:

interval: the quantity by which numbers will be increased or decreased when guessing. The values initially used are specified in each experiment below.
w: the width of the SM.
h: height of the SM+1; where SM[1,h] contains the GP, SM[2 . . . w,h] are empty
Ð: the whole data set.

The procedure is as follows:
1. initialize the variable 'interval'
2. for j←1 to h
3. for i←1 to w
4. QE1←QE(SM,Ð)//the QE calculated with the current SM for Ð
5. SMij_orig←SM[i,j]
6. Do
7. SM[i,j]←SM[i,j]+interval
8. QE2←QE(SM,Ð)//the QE calculated with the current SM for Ð
9. if QE2>QE1
10. QE1←QE2
11. SMij_new←SM[ij]
12. Until QE2<QE1
13. SM[i,j]←SMij_orig//revert to original number
14. QE3←QE1
15. Do
16. SM[ij]←SM[i,j]-interval
17. QE2←QE(SM,Ð)//the QE calculated with the current SM for Ð
18. if QE2>QE3
19. QE3←QE2
20. Until QE3<QE2
21. if QE1>QE3
22. SM[i,j]=SMij_new
23. QE_MAX←QE1
24. else
25. QE_MAX←QE3

26. if j=h then i=w//SM[1,h] contains the GP, SM[2 ... w,h] are empty
27. Next i
28. Next j Again, the original SM shown in FIG. 6a resulted in an overall QE of 563.03. After several iterations of the algorithm with the adjustment "interval" first set to 10, then successively to 8, 5, 3, 2, and finally 1, and starting with the original SM, a new SM as shown in FIG. 6b was determined. The new SM yielded a Query Effectiveness of 1247.78.

Note that the new scoring matrix developed as expected, having mainly large positive numbers along the diagonal, and mostly large negative numbers elsewhere. More importantly, this new SM implies that users are more likely to find the song they are looking for closer to the top of the list. This is because the new SM compensates for human error in an "intelligent" way, that is, in a systematically derived manner that compensates for human errors in input.

Another experiment was performed wherein the assumed SM consisted of all 0s, and the GP was also set to 0. This experiment yielded a QE of 129.1. The adjustment 'interval' as used in the above pseudocode was initially set to 10, and then successively reduced to 8, 5, 3, 2, and finally 1. This yielded the SM of FIG. 6c and a QE of 1126.40, which is almost as high as the SM of FIG. 6b.

Combining Parsons and Kolta codes allows a user to find a melody more efficiently. The Parsons code has three possible values for every note in a melodic line. The number of possible unique melodies that may therefore be represented in x data points is $3^x$. The Kolta code also has, ignoring rests, three possible values, "L," "S," and "R." So, when the Parsons and Kolta codes for a particular melody are combined, there are 9 (i.e., 3*3) possible values for each pair of consecutive notes, or data points. Consequently, with only half as many data points, there are $9^{1/2x}$ or $3^x$ possible melodies, the same number of unique melodies as the Parsons code, but analyzing only half the number of data points. This is because each data point has more information when the Parsons and Kolta codes are combined. It is believed that including rests is helpful in uniquely identifying melodies, although rests are not considered in the embodiment of the system chosen for purposes of disclosure.

It is believed that most people can remember and recreate this level of detail, that is to say "L," "S," or "R," about the rhythm of a melody more effectively than the exact rhythm of a melody as presented in standard western musical notation. The Kolta code also overcomes the inherent complications of tempo and time signature that may be difficult for even a trained musician to recreate accurately. This doubling of information for each pair of notes is believed to enhance the results of a query in many situations. For example, the doubled information is significant when only a very small excerpt of a melody is remembered. The user's ability to recall the relative rhythm of that excerpt from the melody provides useful information and compensates for the short length of the melody excerpt in the query.

The Kolta code is a type of rhythmic abstraction, just as the Parsons code is a melodic abstraction. The term, "abstraction," as used herein is defined as a simplified representation that maintains some essence of the original melody while other details are lost. There have been many other attempts at musical abstraction, some of which will be discussed hereinbelow.

For example, a more sophisticated version of the Parsons code is described in the paper, "MUSART: Music Retrieval Via Aural Queries"[3]. This code uses both capital and lowercase letters for up and down. A capital "U" is used for an ascending interval that is greater than or equal to a minor third, and a lowercase "u" for less than a minor third. Likewise, "D" and "d" are used for descending intervals.

Another common musical abstraction is known as "directed modulo-12 standardization"[4]. This is a fairly obvious abstraction where the interval between consecutive notes in a melody are represented by integers between −12 and +12. This range of numbers represents the number of semitones between the two pitches in the Western-style notation system. A number is positive if the second pitch is higher than the first, and negative if it is lower than the first. If an interval actually exceeds 12 semitones or one octave, which is extremely rare, then the modulo 12 of the number of semitones between the two pitches is used, thus the name of the algorithm. Therefore, the absolute value of the numbers never exceeds 12. This abstraction makes sense for querying for a melody based on intervals if the user is able to recreate the exact pitch intervals in the melody. Typically, only a well-trained musician can achieve the necessary level of accuracy.

The paper, "*Melodic Similarity, Looking for a Good Abstraction Level*"[5], provides a unique proposal for a melody abstraction. It makes the valid point that the same "melody" can exist in different forms as it is expressed in different styles of music. It proposes a system which breaks notes down into groups of three, and then assigns that group a character depending on the relative intervals between those three notes. For example, a group of three notes which all ascend by small intervals is seen as one type. Another group of three notes which all ascend, but with a small first interval and large second interval, is seen as a second type, etc. This system is a type of a music cognition approach to identifying a melody. The system attempts to classify the "mood" of a set of three notes, rather than the actual pitches or intervals within each group.

Another paper, "*Drum Loops Retrieval From Spoken Queries*"[6], addresses a different but related problem of finding drum beats that are rhythmic but not melodic. The paper proposes the use of onomatopoeias as the abstract for representing specific drum sounds. For example, "boom" represents a bass drum, "ta" represents a snare drum, etc. The user essentially does what is known to those of skill in the art as a "beatbox" performance into a microphone, and the system uses the resulting input as the basis for the query and attempts to find beats that are similar to the query. This method focuses as much on the types of drums that are making sound and the order in which they occur as on the actual rhythm and timing of those events.

Still another approach to finding information in a database based upon a portion of a melody is described by the paper, "*Query by Rhythm: an Approach for Song Retrieval in Music Databases*"[7]. This approach utilizes concepts called "mubols," or rhythm strings, and occurrence times. A mubol is a rhythm pattern of a single measure in a song. A set of consecutive mubols, which considers only rhythm and ignores pitch, is a rhythm string. An occurrence time refers to the occurrence times of the individual notes. The algorithm used for matching is rather complex and is similar to finding a Longest Common Subsequence (LCS) but with parameters that allow for fuzziness and error tolerances. This method does require that the input be presented in Western-style notation, which requires some musical training on the part of the user.

A rhythm abstraction that is somewhat common and provides useful information is the log-based difference-encoded descriptor. It uses the equation:

$$s_i = \log(s_{i+1}) - \log(s_i)_{35} \quad (1)$$

Another similar rhythm abstraction is defined by the equation:

$$\text{Ratio} = \frac{(\text{Onset}_{i+2} - \text{Onset}_{i+1})}{\text{Onset}_{i+1} - \text{Onset}_i)} \cdot 36 \qquad (2)$$

While such information (e.g., $s_i$ or Ratio) is useful, processes to extract the information typically require exact details concerning a melody to be used in the query. It is difficult, if not impossible, for a non-musically trained user to provide the required level of detail about a melody. Furthermore, the Kolta code uses only three possible values and, therefore, requires less space to store, typically resulting in faster search times.

A radically different approach is described in the paper, "*Time Series Alignment for Music Information Retrieval*"[8]. This paper describes a pitch histogram method wherein the number of occurrences of each pitch forms a histogram. This histogramatic representation leads to a compromise between the note representations and contour representations, which causes a compromise in the performance between rapid alignment and robust (i.e., accurate) performance.

The inventor of the present invention has analyzed and compared the strengths of these musical abstractions with the Kolta code that forms part of the instant invention. It will be recognized by those of skill in the art that the Kolta code abstraction may be combined with one or more of the above-described abstractions to provide enhanced performance (i.e., speed and/or robustness) in accurately identifying a song from a melodic fragment.

To determine the effectiveness of the Kolta code, either in a stand-alone or a combination configuration, a database of Musical Instrument Digital Interface ("MIDI") files containing only melodies, typically easily identifiable melodies, was constructed. It should be noted that the method of extracting suitable entries for a MIDI database useful in practicing the invention forms no part of the present invention, and any suitable method of extracting suitable data from audio or full MIDI files may be used. The experimental database contains a combination of pop songs and western classical music. The experimental database was compiled, at least in part, using IMIRSEL[9], an International MIR Systems Evaluation Library established in 2004.

A computer program was written and used to convert the MIDI database into strings, each string containing the Parsons code and Kolta code for each melody. It will also be recognized that many strategies may be utilized to store the Parsons and/or Kolta codes. Consequently, the invention is not considered limited to any particular storage schema. Rather, the invention comprehends any and all suitable storage methods.

A suitable user interface may be used to enter the Parsons code and/or the Kolta code for each melody. The interface may be designed to allow additional or substitute abstractions. One feature of the interface is the use of Java® Applets, thereby allowing the interface to be platform-independent and, if desired, easily ported to the World Wide Web.

Dynamic programming and string-matching techniques[10] may be used in a variety of ways. Using only exact matching yields a baseline level of performance. To improve recognition performance, artificial intelligence (AI) techniques, such as fuzzy logic and error tolerances may be implemented. Such techniques are useful in comparing the performance of exact matching systems to approximate matching systems when the input is not perfect. It is empirically observed that the vast majority of queries submitted to a real-world system will contain non-perfect input so approximate matching capability is critical.

Such techniques may also be used to evaluate the musical abstractions and/or analysis systems. Such systems may analyze such parameters as precision and recall, response time, user effort, form of presentation, and collection coverage as identified in "*The Effectiveness Study of Various Music Information Retrieval Approaches*"[11]. Recall is defined as $$\frac{|R_a|}{|R|}$$

where $|R_a|$ is the number of relevant documents retrieved, and $|R|$ is the number of relevant documents. Precision is defined as $$\frac{|R_a|}{|A|}$$

where $|A|$ is the number of documents retrieved.

The novel system of the invention provides an enhancement in the field of MIR by providing an improved tool for finding songs via melody.

The novel query by melody methodology is useful in conjunction with the proposed enhancements to the MPEG 7 file standard. The proposed enhancements to the MPEG 7 file standard include a new format for music notation similar to MIDI which provides the necessary meta-tags for the methods of the present invention. In addition, the process of extracting the melody from the audio file can be an entirely separate process that is performed only once, and then stored in the MPEG 7 file in order to make the information readily available without having to re-extract the melody every time[12]. Currently, the creation of this meta-data in the form of MIDI-like data must be performed manually, but there is research being conducted attempting to have this meta-data created automatically by a computer as discussed in the papers; "*Content-based Identification of Audio Material Using MPEG-7 Low Level Description*"[13] and "*Techniques for Automatic Music Transcription*"[14].

The embodiment of the inventive system chosen for purposes of disclosure has utilized the well-known "U," "D," "R" encoding of the Parsons code. It will be recognized that other pitch encoding schemes exist or could be created wherein finer increments of change in pitch may be encoded. For example, instead of simply quantifying an upward change in pitch as "U," the pitch change could be quantified in such categories as: up a half step or a whole step; up a minor or major third; up a perfect or an augmented fourth; up a perfect or an augmented fifth; up an interval greater than an augmented fifth, etc. Likewise, these same categories could be assigned to downward changes in pitch.

Because more permutations and combinations are now possible than when a simple Parsons, three-category code is utilized, a larger SM, that is a SM having greater dimensions, is required.

As discussed hereinabove, the SM has been based on group input—the resulting SM being optimized for an entire population. However, it will be recognized that by using iterative training techniques, an SM may be optimized for an individual user. This is analogous to training speech recognition software to perform optimally for a single user. Each individual user of the method and system of the invention may exhibit unique idiosyncrasies in his or her entry of either the pitch relationships and/or the rhythmic relationships of a melodic fragment. For example, a particular user may constantly sing or hum an interval of a fourth when the true interval should be a fifth. Such training could be used to compensate for such idiosyncrasies.

It may be observed that as a query deviates from a perfect query, the relative positions of possible results located by the algorithm of the inventive method may shift in a seemingly unpredictable manner. This is an inherent property of the system and such behavior has no relevance to the performance thereof.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

REFERENCES

1. Parsons, Denys. "*The Directory of Tunes and Musical Themes.*" Spencer Brown & Co.: Cambridge, England, January 1975.
2. Petrov, Peter Angelov. "*Smith-Waterman Algorithm Implemented.*" November 2007. http://www.geocities.com/sedefcho/www/algorithms/smith_waterman.html.
3. Birmingham, William P., Roger B. Dannenburg, Gregory H. Wakefield, Mark Bartsch, Dominic Mazzoni, Collin Meek, Maureen Mellody, William Rand (2001). "*MUSART: Music Retrieval Via Aural Queries.*" In: Proceedings of 2nd Annual International Symposium on Music Information Retrieval 2001 (pp. 73-81): Oct. 15-17, 2001, Bloomington, Ind. (USA). http://ismir2001.ismir.net/pdf/birmingham.pdf.
4. Suyoto, Iman S. H. and Alexandra L. Uitdenbogerd (2005). "*Simple Efficient N-Gram Indexing For Effective Melody Retrieval.*" In: Proceedings of the Music Information Retrieval Evaluation eXchange 2005. http://www.music-ir.org/evaluation/mirex-results/articles/similarity/suyoto.pdf.
5. Maarten Grachten, Josep-Llu'is Arcos, and Ramon L'opez de M'antaras (2004). "*Melodic Similarity, Looking for a Good Abstraction Level.*" In: Proceedings of 5th International Conference on Music Information Retrieval: Oct. 10-15, 2004, Barcelona (Spain). http://ismir2004.ismir.net/proceedings/p040-page-210-paper166.pdf.
6. Gillet, Olivier and Gael Richard. "*Drum Loops Retrieval From Spoken Queries.*" Journal of Intelligent Information Systems 24(2): 159-177, 2005.
7. Chen, James C. C., and Arbee L. P. Chen (1998). "*Query by Rhythm: an Approach for Song Retrieval in Music Databases.*" In: Proceedings of Eighth International Workshop on Research Issues in Data Engineering (pp. 139-146).
8. Adams, Norman H., Mark A. Bartsch, Jonah B. Shifrin, Gregory H. Wakefield (2004). "*Time Series Alignment for Music Information Retrieval.*" In: Proceedings of 5th International Conference on Music Information Retrieval: Oct. 10-15, 2004, Barcelona (Spain). http://ismir2004.ismir.net/proceedings/p056-page-303-paper144.pdf.
9. Downie, J. Stephen, Joe Futrelle, and David Tcheng (2004). "*The International Music Information Retrieval Systems Evaluation Laboratory: Governance, Access and Security.*" In: Proceedings of 5th International Conference on Music Information Retrieval: Oct. 10-15, 2004, Barcelona (Spain). http://ismir2004.ismir.net/proceedings/p002-page-9-paper220.pdf.
10. Pauws, Steffen (2002). "*CubyHum: A Fully Operational Query by Humming System.*" In: Proceedings of the 3rd International Conference on Music Information Retrieval (pp. 187-196): Oct. 13-17, 2002, Paris (France). http://ismir2002.ismir.net/proceedings/02-FP06-2.pdf#search=%22%22melody %20encoding %22%22.
11. Jia-Lien, Hsu, Arbee L. P. Chen, Hung-Chen Chen, and Ning-Han Liu (2002). "*The Effectiveness Study of Various Music Information Retrieval Approaches.*" In: Proceedings of the Eleventh International Conference on Information and Knowledge Management, SESSION: Music information retrieval (pp. 422-429): Nov. 4-9, 2002, SAIC Headquarters, McLean, Va. (USA). http://portal.acm.orgicitation.cfm?id=584862&d1.
12. Fuschi, David (2003). "*MusicNetwork Scenarius.*" Version 3.6, Jun. 27, 2003. In: Second MusicNetwork Open Workshop: Sep. 17-18, 2003, University of Leeds, Leeds, UK. http://www.interactivemusicnetwork.org/events/Second_OpenWorkshop_2003/13.doc.
13. Allamanche, Eric, Jurgen Herre, Oliver Hellmuth, Bernard Froba, Thorsten Kastner, and Markus Cremer (2001). "*Content-based Identification of Audio Material Using MPEG-7 Low Level Description.*" In: Proceedings of 2nd Annual International Symposium on Music Information Retrieval 2001 (pp. 197-204): Oct. 15-17, 2001, Bloomington, Ind. (USA). http://ismir2001.ismir.net/pdf/allamanche.pdf.
14. Bello, Juan Pablo, Giuliano Monti, and Mark Sander (2000). "*Techniques for Automatic Music Transcription.*" In: Proceedings of International Symposium on Music Information Retrieval: Oct. 23-25, 2000, Plymouth, Mass. (USA). http://ismir2000.ismir.net/papers/bello_paper.pdf.

Having thus described the invention, what is desired to be protected by Letters Patent is presented in the subsequently appended claims.

What is claimed is:

1. A method of retrieving information related to a known melody from a database, the steps comprising:
   a) inputting at least a fragment of a known melody to a computer interface;
   b) deriving relative pitch information and relative rhythm information for said inputted melodic fragment;
   c) encoding said derived relative pitch information and said relative rhythm information to create an encoded representation of said melodic fragment, the encoded representation being in the form of a KP code; and
   d) comparing said encoded representation to a database of pre-compiled, encoded musical information representative of at least one melody.

2. The method of retrieving information related to a known melody from a database as recited in claim 1, wherein said comparing step (d) comprises using a Smith-Waterman algorithm.

3. The method of claim 2, wherein the encoded representation is in the form of a KP code comprising nine unique possible values.

4. The method of claim 3, wherein the nine unique possible values of the KP code consist of:
   down-short;
   repeat-short;
   up-short;
   down-repeat;
   repeat-repeat;
   up-repeat;

down-long;
repeat-long; and
up-long.

5. The method of claim 4, wherein the step of using a Smith-Waterman algorithm comprises establishing a scoring matrix, the scoring matrix comprising a plurality of matching scores, and wherein matching KP codes of repeat-short, repeat-repeat, and repeat-long have the highest scores within the scoring matrix.

6. The method of claim 5, wherein the scoring matrix further comprises a plurality of mismatch penalties, and the mismatch of a KP code of down-short with up-long has the largest penalty within the scoring matrix.

7. The method of claim 6, wherein the step of using a Smith-Waterman algorithm further comprises establishing a gap penalty.

8. The method of claim 6, wherein the gap penalty is 58.

9. The method of retrieving information related to a known melody from a database as recited in claim 1, wherein said deriving relative pitch information step (b) comprises categorizing a change in pitch of a note relative to a preceding note in said inputted melodic fragment into at least three categories.

10. The method of retrieving information related to a known melody from a database as recited in claim 9, wherein said deriving relative pitch information step (b) comprises: using a musical abstraction wherein a change in pitch of a note in said inputted melodic fragment relative to a preceding note in said inputted melodic fragment is categorized into at least one of the categories selected from the set: no change in pitch; up a half or a whole step; up a minor or a major third; up a perfect or an augmented fourth; up a perfect or an augmented fifth; up an interval greater than an augmented fifth; down a half or a whole step; down a minor or a major third; down a perfect or an augmented fourth; down a perfect or an augmented fifth; and down an interval greater than an augmented fifth.

11. The method of retrieving information related to a known melody from a database as recited in claim 9, wherein said comparing step (d) comprises the sub-step of using a Smith-Waterman algorithm in conjunction with a scoring matrix having a dimension related to the number of said at least three distinct categories.

12. The method of retrieving information related to a known melody from a database as recited in claim 11, the steps further comprising:
  e) training said scoring matrix by compensating for idiosyncrasies in entry of the pitch relationships of a melodic fragment.

13. The method of retrieving information related to a known melody from a database as recited in claim 12, wherein said training step (e) comprises iteratively training said scoring matrix.

14. The method of retrieving information related to a known melody from a database as recited in claim 13, wherein said training step (e) comprises training said scoring matrix for at least one of the populations selected from the group: a single user, a predetermined group of users, and a general population.

15. The method of retrieving information related to a known melody from a database as recited in claim 1, wherein said deriving step (b) comprises determining whether the pitch of a note of said melodic fragment is higher, lower, or the same as a preceding note of said melodic fragment.

16. The method of retrieving information related to a known melody from a database as recited in claim 1, wherein said deriving step (b) comprises: determining whether the duration of a note of said melodic fragment is longer, shorter, or the same as a preceding note of said melodic fragment.

17. The method of retrieving information related to a known melody from a database as recited in claim 1, wherein said deriving step (b) comprises the sub steps:
  i. determining whether the pitch of a note of said melodic fragment is higher, lower, or the same as a preceding note of said melodic fragment; and
  ii. determining whether the duration of a note of said melodic fragment is longer, shorter, or the same as a preceding note of said melodic fragment.

18. The method of retrieving information related to a known melody from a database as recited in claim 1, wherein said comparing step (d) comprises matching said encoded representation of said melodic fragment to a similarly encoded melody in said database.

19. The method of retrieving information related to a known melody from a database as recited in claim 18, the steps further comprising:
  f) providing an indication of successful matching of said encoded representation of said melodic fragment to a similarly encoded melody in said database.

20. The method of retrieving information related to a known melody from a database as recited in claim 1, wherein said database comprises at least one of the items selected from the group: bibliographic data relating to said encoded melody, and a digitized representation of a song represented by said similarly encoded melody.

21. A method for retrieving information related to a known melody from a database, the steps comprising:
  a) assigning a first variable to a musical note within at least a fragment of a known melody based upon a pitch of the musical note relative to the pitch of a preceding note within said at least a fragment of said known melody, the first variable comprising possible values of down, up, and repeat;
  b) assigning a second variable to a musical note within at least a fragment of a known melody based upon a length of the musical note relative to the length of a preceding note within said at least a fragment of said known melody the second variable comprising possible values of short, long, and repeat;
  c) assigning a third variable to a musical note within at least a fragment of a known melody representing a combination of said first variable and said second variable representative thereof, the third variable comprising possible values of:
  down-short;
  repeat-short;
  up-short;
  down-repeat;
  repeat-repeat;
  up-repeat;
  down-long;
  repeat-long; and
  up-long;

d) compiling a code consisting of a sequence of said third variables corresponding to a plurality of sequential musical notes within said at least a fragment of a known melody;

e) inputting said compiled code into a computer via a computer interface; and f) within said computer, using a first algorithm to compare said compiled code to a coded-music database comprising a plurality of musical files, each of said musical files comprising information related to the a relative change in a pitch and a length of a plurality of musical notes within each file.

22. The method for retrieving information related to a known melody from a database as recited in claim 21, the steps further comprising:
   i) providing an indication to a user of the at least one musical file matched.

* * * * *